United States Patent
Guo et al.

(10) Patent No.: US 8,414,987 B2
(45) Date of Patent: Apr. 9, 2013

(54) PRIMER COMPOSITION FOR CURED SILICON-CONTAINING SURFACE AND ITS USES

(75) Inventors: Shang-Hsin Guo, Wufong Town (TW); Wen-Ching Tsay, Taichung (TW); Bor-Kai Hsiung, Taichung (TW)

(73) Assignee: Great Eastern Resins Industrial Co., Ltd., Taichung (TW)

( * ) Notice: Subject to any disclaimer, the term of this patent is extended or adjusted under 35 U.S.C. 154(b) by 0 days.

(21) Appl. No.: 13/366,500

(22) Filed: Feb. 6, 2012

(65) Prior Publication Data

US 2012/0201973 A1    Aug. 9, 2012

Related U.S. Application Data

(63) Continuation-in-part of application No. 12/409,619, filed on Mar. 24, 2009, now Pat. No. 8,133,552.

(30) Foreign Application Priority Data

Dec. 12, 2008   (TW) ................ 97148409 A

(51) Int. Cl.
*B05D 3/14* (2006.01)

(52) U.S. Cl.
USPC ........... 427/578; 427/489; 427/535; 427/536; 427/539; 556/436; 556/437

(58) Field of Classification Search .......... None
See application file for complete search history.

(56) References Cited

U.S. PATENT DOCUMENTS

| | | |
|---|---|---|
| 4,067,844 A | 1/1978 | Barron et al. |
| 5,260,350 A | 11/1993 | Wright |
| 5,368,941 A | 11/1994 | Blizzard et al. |
| 5,374,483 A | 12/1994 | Wright |
| 6,686,008 B1 | 2/2004 | Merlin et al. |
| 6,921,623 B2 | 7/2005 | Hanabata et al. |
| 2004/0092640 A1 | 5/2004 | Makino et al. |
| 2008/0312401 A1 | 12/2008 | Sato et al. |
| 2009/0200165 A1 | 8/2009 | Sudor et al. |

FOREIGN PATENT DOCUMENTS

| | | |
|---|---|---|
| CA | 2069861 | 11/1993 |
| EP | 1352936 | 10/2003 |
| EP | 1 234 517 | 6/2005 |
| JP | 7-18221 | 1/1995 |
| TW | 565595 | 12/2003 |

OTHER PUBLICATIONS

Application and File History of U.S. Appl. No. 12/490,619, Inventor Shang-Hsin Guo et al.., filed date Mar. 24, 2009, now U.S. Patent No. 8,133,552 issued Mar. 13, 2012, as available on www.uspto.gov.
Machine generated translation of EP 1359936 (1993).
"Synthesis, Structure, and Bioactivity of pHEMA-SI02 Hybrids Derived Through In Situ Sol-gel Process" authored by Luciani et al., and published in the Journal of Sol-Gel Science and Technology (2008) 46, 166-175.
"Synthesis and Characterization of Water-soluble Silsesquioxane-Based Nanoparticles by Hydrolytic Condensation of Triethoxysilane Derived from 2-Hydroxyethyl Acrylate" authored by Mori et al. And published in Langmuir (2007) 23, 9014-9023.

*Primary Examiner* — Marc Zimmer
(74) *Attorney, Agent, or Firm* — Patterson Thuente Pedersen, P.A.

(57) ABSTRACT

A method for improving an adhesion of an adhesive to a cured silicon-containing surface is provided. The method comprises applying a primer composition to the surface before applying the adhesive; and subjecting the surface to a plasma treatment before or after the composition is applied thereto; wherein the primer composition comprises a polar organic solvent, an acrylic monomer, and an amino-containing silane.

9 Claims, No Drawings

PRIMER COMPOSITION FOR CURED SILICON-CONTAINING SURFACE AND ITS USES

CROSS-REFERENCES TO RELATED APPLICATION

This application is a continuation-in-part of and claims priority to U.S. patent application Ser. No. 12/409,619, filed Mar. 24, 2009, now U.S. Pat. No. 8,133,522, which application claims priority to TW application no. 097148409 filed Dec. 12, 2008, which applications are herein incorporated by reference.

BACKGROUND OF THE INVENTION

1. Field of the Invention

The present invention relates to a primer composition for a cured silicon-containing surface and its uses. In particular, the present invention relates to a primer composition for a cured silicone elastomer surface and its uses.

2. Descriptions of the Related Art

Currently, a lot of the commercial products use silicon-containing materials, in which the silicone elastomer is one of the widely used materials. The silicone elastomer is generally applied on various fields, such as insulation tubes of electric equipments, pacifiers, injection pipes, drying agents, dust shields, components of food producing machines, soft molds used in industries, adhesives, sealing gels for glass or aluminum doors and windows, and the like. The silicone elastomer, also known as polymerized siloxane, is substantially composed of organic monomers and inorganic monomers. Its chemical formula is $[R_2SiO]_n$, in which each R independently represents methyl, ethyl, or phenyl.

The cured silicon elastomer has properties of stability (low reactivity), low toxicity, weatherability, water resistance, acid and alkali resistance, and electrical specification and is not easily yellowed or brittled by the irradiation of the UV light. Therefore, the cured silicone elastomer has been widely used in many industries. In particular, the cured silicone elastomer has became an important material in the biotechnical and cosmetic industries, such as medical pipes, artificial cartilages, artificial chins, artificial breasts, and replicas used in odontology.

The cured silicone elastomer can usually be classified into two types: liquid silicone elastomer and solid silicone elastomer. The liquid silicone elastomer, also known as room temperature vulcanization (RTV) silicon elastomer, is produced primarily by performing a condensation of the silane monomers through the moisture in the air at room temperature. The solid silicone elastomer, also known as high temperature vulcanization (HTV) silicone elastomer, is vulcanized primarily in two manners. The first manner is the addition vulcanization, which performs a crosslinking reaction of the silane monomers to form a polymer in the presence of a catalyst such as platinum. The second manner is the radical vulcanization, which induces a polymerization through the radicals of peroxides at a high temperature and vacuum to form a polymer of silicone elastomer.

There are only few functional groups in the cured silicone elastomer and most functional groups are C—H single bonds. The surface free energy of the cured silicone elastomer is relatively low, and therefore, the adhesive cannot be easily adhered thereon. It is hard to bond the cured silicone elastomer with other materials using an adhesive. In the past, the cured silicone elastomer has been fixed on other materials mainly via stitching. Using this manner, however, holes will be produced on the cured silicone elastomer, and thus destroys its structure and influences the overall look. The reactive silicone elastomer hot glue (product name: HM-2500) produced by Dow Corning Company is used to attach the cured silicone elastomer. However, the bonding effect provided by HM-2500 hot glue for the cured silicone elastomer cannot be well satisfied and will decrease over time.

Given the above, although the cured silicone elastomer itself has excellent properties such as weatherability, water resistance, acid and alkali resistance and the like, its poor adhesion effect of the adhesive will greatly decrease its practicability. There is a need for effectively attaching a cured silicone elastomer on other materials to improve the applicability of the cured silicon elastomer. Therefore, the subject invention provides a primer composition for improving an adhesion of an adhesive to a cured silicon-containing surface to improve the availability of the cured silicon-containing material.

SUMMARY OF THE INVENTION

One objective of the subject invention is to provide a primer composition for a cured silicon-containing surface, comprising a polar organic solvent, an acrylic monomer, and an amino-containing silane having a formula of $(R^1O)_x(R^2)_ySiR^3NHR^4$.

Another objective of the subject invention is to provide a method for improving an adhesion of an adhesive to a cured silicon-containing surface, comprising applying the primer composition of the subject invention to the surface.

The detailed technology and preferred embodiments implemented for the subject invention are described in the following paragraphs so that people skilled in this field can well appreciate the features of the subject invention.

BRIEF DESCRIPTION OF THE DRAWINGS

No figures.

DESCRIPTION OF THE PREFERRED EMBODIMENT

The primer composition of the subject invention comprises a polar organic solvent, an acrylic monomer, and an amino-containing silane having a formula of $(R^1O)_x(R^2)_ySiR^3NHR^4$. For the formula $(R^1O)_x(R^2)_ySiR^3NHR^4$ of the amino-containing silane, each $R^1$ independently represents H, $C_1$-$C_{12}$ hydrocarbonyl, or aryl, preferably $C_1$-$C_6$ alkyl;

each $R^2$ independently represents H, O, $C_1$-$C_{12}$ hydrocarbonyl, or aryl, preferably $C_1$-$C_6$ alkyl;

$R^3$ represents divalent $C_1$-$C_6$ hydrocarbonyl being substituted or unsubstituted with one or more aryl rings and the carbon atom chain of the hydrocarbonyl can be inserted with one or more aryl rings, and $R^3$ preferably represents $C_1$-$C_6$ alkylene being unsubstituted or not inserted with aryl rings;

$R^4$ represents H, $C_1$-$C_{12}$ hydrocarbonyl, amino-$C_1$-$C_{12}$ hydrocarbonyl, or phenylamino, preferably H, $C_1$-$C_6$ alkyl, or amino-$C_1$-$C_6$ alkyl; and x is 1, 2 or 3, y is 0, 1 or 2, and the sum of x and y is 3.

According to one embodiment of the inventive composition for the amino-containing silane, $R^1$ independently represents $C_1$-$C_4$ alkyl, $R^3$ represents $C_1$-$C_4$ alkylene, $R^4$ represents H, $C_1$-$C_4$ alkyl or amino-$C_1$-$C_4$ alkyl, and x is 3. In another preferred embodiment, each $R^1$ independently represents methyl or ethyl, $R^3$ represents propylene, and $R^4$ represents H, butyl or amino-ethyl in the formula $(R^1O)_x(R^2)_y SiR^3NHR^4$.

For example, the amino-containing silane useful in the composition of the subject invention may be selected from a group consisting of N-(n-butyl)-3-aminopropyltrimethoxysilane, N-(n-butyl)-3-aminopropyl-triethoxysilane, 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, 3-aminopropyl-methyldiethoxysilane, and combinations thereof. Preferably, the amino-containing silane is selected from a group consisting of N-(n-butyl)-3-aminopropyltrimethoxysilane, 3-aminopropyltriethoxysilane, N-(2-aminoethyl)-3-aminopropyltrimethoxysilane, and combinations thereof, but not limited thereto.

The amount of the amino-containing silane typically ranges from about 1 wt % to about 35 wt %, preferably from about 5 wt % to about 25 wt %, and more preferably from about 10 wt % to about 20 wt %, based on the total weight of the composition. If the amount of the amino-containing silane is too large, the viscosity of the prepared composition may be excessively high. As a result, it is difficult to perform a coating step with the composition of such a high viscosity. Furthermore, the high viscosity may result in a non-uniform adhesion between the coated surface and the adhesive. If too small, the desired effect of improving the adhesion of the adhesive to the surface cannot be achieved.

In addition to the amino-containing silane, the primer composition of the subject invention further comprises an acrylic monomer. For example, the acrylic monomer useful in the composition of the subject invention may be selected from a group consisting of hydroxymethyl acrylate, hydroxymethyl methacrylate, hydroxyethyl acrylate, hydroxyethyl methacrylate, hydroxypropyl acrylate, hydroxypropyl methacrylate, glycidyl acrylate, glycidyl methacrylate, dimethylaminoethyl acrylate, dimethylaminoethyl methacrylate, tert-butylamino-methacrylate, acrylamide, methacrylamide, N-methylol-methacrylamide, and combinations thereof. Preferably, the composition of the subject invention uses an acrylic monomer containing hydroxyl. For example, the acrylic monomer containing hydroxyl may be selected from a group consisting of hydroxymethyl acrylate, hydroxymethyl methacrylate, hydroxyethyl acrylate, hydroxyethyl methacrylate, hydroxypropyl acrylate, hydroxypropyl methacrylate, and combinations thereof.

In the composition of the subject invention, the amount of the acrylic monomer typically ranges from about 0.01 wt % to about 25 wt %, preferably from about 3 wt % to about 15 wt %, and more preferably from about 5 wt % to about 10 wt %, based on the total weight of the composition.

The composition of the subject invention also comprises a polar organic solvent which substantially composes a balance portion of the composition. The polar organic solvent useful in the composition of the subject invention may be selected from a group consisting of ethyl acetate, methyl ethyl ketone, propylene glycol methyl ether, cyclohexanone, acetone, ethanol, methanol, isopropanol, methyl siloxanes (such as hexamethyl disiloxane, octamethyl trisiloxane, decamethyl tetrasiloxane), and combinations thereof, and combinations thereof. The polar organic solvent is preferably selected from a group consisting of ethyl acetate, methyl ethyl ketone, hexamethyl disiloxane, octamethyl trisiloxane, decamethyl tetrasiloxane, and combinations thereof. The composition of the subject invention can optionally comprise a non-polar organic solvent selected from a group consisting of toluene, xylene, methyl cyclohexane, hexane, cyclohexane and combinations thereof, and preferably toluene.

It is well known that when attaching two surfaces to improve the bonding effect, a pretreatment step is optionally performed before applying an adhesive to the surface to be attached to improve the adhesion effect between the surface and the adhesive. For example, the surface to be attached may be wiped with liquids such as alcohol or rubbed with sand papers to clean, erode and/or destroy the microstructure of the surface. This can enlarge the contact area between the surface and the adhesive. Alternatively, the surface to be attached may be soaked in or applied with a suitable solvent to improve its wettability, which is advantageous for the adhesion of the adhesive on the surface. Furthermore, providing functional groups on the surface to be attached improves the adhesion strength between the surface and the adhesive through the reactive chemical bonding. The inventors of the subject application found that the composition of the subject invention containing specific components and proportions can increase the wettability of the cured silicon-containing surface and provide functional groups thereon, thereby improving the adhesion of the adhesive to the cured silicon-containing surface.

Without being bound by theory, it is believed that in the composition of the subject invention, the amino group of the amino-containing silane may react with the functional group of the acrylic monomer. The resulting coating layer may form a chemical bond with various adhesives, such as polyurethane adhesive (PU adhesive). Besides, it is believed that the presence of the acrylic monomer can also improve the initial adhesion between the cured silicon-containing surface that is coated and the adhesive, which is advantageous to the attaching operation. Furthermore, the silicon-containing functional group of the amino-containing silane also exhibits a good affinity to the cured silicon-containing surface. Therefore, the composition of the subject invention comprises both the amino-containing silane and the acrylic monomer that facilitates improving the adhesion of the adhesive to the cured silicon-containing surface.

As stated before, the composition of the subject invention has an affinity to the cured silicon-containing surface and can form a chemical bond with the adhesive. The composition of the subject invention thus can be used as a primer composition which is applied to a cured silicon-containing surface to be attached before coating an adhesive on the surface to improve the adhesion of the adhesive to the cured silicon-containing surface. The material of the cured silicon-containing surface may be selected from a group consisting of glass, glass fiber, silicone elastomer, and combinations thereof. In one preferred embodiment of the subject invention, the primer composition is applied to the cured silicone elastomer surface.

When applying the composition of the subject invention to the cured silicon-containing surface, the surface may be optionally subjected to a surface treatment before or after the composition is applied thereto, such as a plasma treatment or an ultraviolet (UV) light irradiation. Without being bound by theory, it is believed that such surface treatment can destroy the polymer structure of the cured silicon-containing surface and will also graft a portion of radicals formed by the surface treatment onto the destroyed polymer to form functional groups to improve the adhesion between the silicon-containing surface and the adhesive.

For example, in the case of applying the composition of the subject invention to a cured silicone elastomer surface, when using the UV light to irradiate the cured silicon elastomer surface which has been coated with the composition of the subject invention, it is possible to break the silane double bond in the cured silicone elastomer, and therefore, the oxygen radical formed by the UV light may be grafted thereon to form a silanol group. The amino-containing silane is hydrolyzed through the moisture in the air, and then conducts condensation reaction with the silanol group on the surface for graft reaction. Besides, the amino group in the amino-containing silane will react with the acrylic monomer to form a surface coating layer which may form a chemical bond with various adhesives. It is known from the above description that the additional use of the UV light can assist the composition of the subject invention in improving the adhesion of the adhesive to the cured silicone elastomer surface.

The wavelength of the UV light used in the subject invention is typically controlled in a range from about 130 nm to about 200 nm, and the UV light has an energy of at least about 15 mW/cm$^2$, such as a UV, light. Moreover, the irradiating time of the UV light is generally about 30 seconds to about 10 minutes and the irradiating height of the UV light is typically controlled in a range from about 2 cm to about 20 cm. The related description for the use of the UV light can be referred to in EP 1 234 517 B1, which is incorporated herein as reference. The high energy UV light apparatus (product name: AS-3000) published by TACK SERVICE, Germany, in 2005 is an example of the commercially available UV light irradiation apparatus.

In the case of the combination use of the UV light irritation, the primer composition of the subject invention can optionally comprise a photoinitiator and a photostabilizer. The photoinitiator useful in the subject invention is not particularly limited and, for example, may be selected from a group consisting of 1-hydroxy cyclohexyl phenyl ketone, benzophenone, 2-hydroxy-2-methyl-1-phenyl-1-propanone, 2-hydroxy-1-[4-(2-hydroxyethoxy)-phenyl]-2-methyl-1-propanone, and combinations thereof. Preferably, the photoinitiator is selected from a group consisting of 1-hydroxy cyclohexyl phenyl ketone, benzophenone, and combinations thereof. Examples of the commercially available photoinitiator are IRGACURE 184, IRGACURE 500, IRGACURE 1173, IRGACURE 2925, and the like. The amount of the photoinitiator is typically not more than about 1 wt % and usually ranges from about 0.01 wt % to about 1 wt %, based on the total weight of the composition.

The photostabilizer useful in the subject invention is also not particularly limited and, for example, may be selected from any commercially available photostabilizer such as Chisorb 519, Chisorb 292, Chisorb 622LD, Chisorb 770, Chisorb 944, and the like. The amount of photostabilizer usually ranges from about 0 wt % to about 0.5 wt %, based on the total weight of the composition.

In addition to the UV light irradiation, the cured silicon-containing surface may also be subjected to a plasma treatment before or after the composition of the subject invention is applied thereto. In the case of applying the composition of the subject invention to a cured silicone elastomer surface, like the UV light irradiation, when the cured silicon elastomer surface which has been coated with the composition of the subject invention is subjected to the plasma treatment, it also possible to break the silane double bond in the cured silicone elastomer, and therefore, the radical formed by the plasma treatment (for example, oxygen radical formed by oxygen plasma or nitrogen radical formed by nitrogen plasma) may be grafted thereon to form a silanol group. The use of the plasma treatment can also assist the composition of the subject invention in improving the adhesion of the adhesive to the cured silicone elastomer surface. As shown in the following examples, the plasma treatment is even more effective in improving the adhesion, especially initial adhesion.

According to the subject invention, the useful plasma can be selected from a group consisting of air plasma, nitrogen plasma, oxygen plasma, and combinations thereof, and preferably, oxygen plasma, and the flow rate of the plasma gas typically ranges from 250 ml/min to 2000 ml/min. Also, the plasma treatment can be carried out at a power of about 500 W to about 2500 W for about 1 minute to about 20 minutes, and preferably at a power of about 2000 W to about 2500 W for about 3 minutes to about 10 minutes.

As described above, one embodiment of the composition of the subject invention is used to treat the cured silicone elastomer surface, such as a costume surface, a shoe surface, a label, and a decoration containing the cured silicone elastomer material. For example, a label of a cured silicon elastomer material is coated with a layer of the composition of the subject invention, followed by a suitable adhesive, to attach the label on a shoe surface. This not only can prevent the conventional damage of the stitch on the label of the cured silicone elastomer material, but also can provide a suitable bonding strength between the shoe surface and the cured silicone elastomer label, as well as an aesthetic appearance and convenient manufacturing process.

Therefore, the subject invention further relates to a method for improving an adhesion of an adhesive to a cured silicon-containing surface, comprising applying the composition of the subject invention to the surface. Any suitable methods may be used to apply the composition of the subject invention to the cured silicon-containing surface. For example, the subject invention may use the coating method selected from a group consisting of manual brushing, soaking, spraying, roller coating, and combinations thereof.

The cured silicon-containing surfaces which have been coated with the composition of the subject invention can exhibit great adhesion with various adhesives, and therefore may be attached with each other or surfaces of other materials through the adhesives. This may solve the problem that the cured silicon-containing surface cannot be attached effectively in the prior art. The other material may be any material that is desirably attached with the cured silicon-containing surface, and comprises, but is not limited to, polymer material such as poly(vinyl chloride) (PVC), ethylene-vinyl acetate (EVA), rubber, nylon, and the like.

The selection of the adhesive is not critical to the subject invention and its species is well known by people with ordinary skill in the art. The adhesive may be selected from an water based PU adhesive usually used in the attaching operation, a solvent based PU adhesive, a rubber-containing adhesive, a silicone elastomer adhesive, and combinations thereof. For example, if the cured silicone elastomer substrate is to be attached to the rubber substrate, the water based PU adhesive may be used as the adhesive.

The method of the subject invention further comprising subjecting the cured silicon-containing surface to a surface treatment before or after the composition is applied thereto, such as a plasma treatment or UV light irradiation. The relevant content for the surface treatment has been clearly explained above and is not repeated here.

The method of using the primer composition of the subject invention for attaching the cured silicon-containing surface substrate substantially comprises the following steps:

(1) applying the composition of the subject invention comprising the polar organic solvent, the acrylic monomer, the amino-containing silane;

(2) optionally subjecting the cured silicon-containing surface (which has been coated) with plasma treatment or the UV light irradiation;

(3) applying an adhesive to the cured silicon-containing surface (which has been coated); and (4) attaching and pressing the cured silicon-containing surface (which has been coated with the adhesive) to another surface to be desirably attached.

In the above steps, the coating layer of the composition of the subject invention on the cured silicon-containing surface may also be dried after step (1) to remove the solvent in the composition. For example, the drying step may be performed by natural drying, using hot air, or placing the coated substrate in an oven. In addition, after step (3), the adhesive layer on the cured silicon-containing surface may be dried, and before attaching and pressing the cured silicon-containing surface with the adhesive layer thereon to another surface, an adhesive layer may be applied to the other surface. The adhesive applied to the cured silicon-containing surface may be identical with or different from that applied to the other surface. The combination selection of the adhesives can thereby provide a better bonding effect.

The time and the temperature of the above drying step vary with the species of the adhesive and the thickness of its coating layer. For example, if the PU adhesive is used and the thickness of the adhesive layer is about 0.2 mm, the drying temperature is normally about 50° C. to about 60° C. and the drying time is about 1 minute to about 3 minutes. The attaching and pressing process (step (4)) is preferably performed during 24 hours after applying an adhesive to the cured silicon-containing surface (step (3)). It is more preferable to perform the attaching and pressing process while the adhesive applied to the cured silicon-containing surface is dried and maintained around the drying temperature. In the case that the dried adhesive layer on the cured silicon-containing surface is cooled to a temperature lower than the effective temperature of the adhesive, it is preferable to heat activate or flash activate the adhesive for example using an oven, and then conduct the attaching and pressing process. Alternatively, the cooled adhesive layer on the cured silicon-containing surface may be deemed as a pre-coating layer. A second adhesive is applied onto the pre-coating layer (i.e., repeating step (3)) and dried, and then, the attaching and pressing process (step (4)) is performed while the second adhesive is maintained around the drying temperature. The second adhesive applied to the pre-coating layer may be identical with or different from the adhesive applied to the cured silicon-containing surface.

In addition to applying the primer composition of the subject invention to the cured silicon-containing surface and then subjecting the coated surface to the UV light irradiation or the plasma treatment as described above, the subject invention also covers the case of subjecting the cured silicon-containing surface to the UV light irradiation or the plasma treatment and then applying the composition of the subject invention to the treated surface to achieve the effect of improving the adhesion of the adhesive to the cured silicon-containing surface.

The embodiments below are illustrated to further describe the subject invention. However, the embodiments provided are intended for illustration, but not to limit the subject invention.

EXAMPLES

Preparation Examples 1 to 6

Each composition was prepared using the species of the components and the amounts listed in Table 1:

TABLE 1

| Component (wt %) | Preparation example 1 | Preparation example 2 | Preparation example 3 | Preparation example 4 | Preparation example 5 | Preparation example 6 |
|---|---|---|---|---|---|---|
| S1 | 20 | | | 20 | | |
| S2 | | 20 | | | 20 | |
| S3 | | | 20 | | | 20 |
| EAC | 70 | 68 | 68 | 25 | 25 | 25 |
| MEK | | | | 8 | 8 | 8 |
| TOL | | 2 | 2 | 2 | 2 | 2 |
| HEMA | 10 | 10 | 10 | 5 | 5 | 5 |
| IRGACURE 184 | | | | 0.1 | 0.1 | 0.1 |
| GRECO 302Si-1 | | | | 39.9 | 39.9 | 39.9 |

S1: Silane monomer, N-(n-butyl)-3-aminopropyltrimethoxysilane
S2: Silane monomer, 3-aminopropyltriethoxysilane
S3: Silane monomer, N-(2-aminoethyl)-3-aminopropyltrimethoxysilane
EAC: Solvent, ethyl acetate
MEK: Solvent, methyl ethyl ketone
TOL: Solvent, toluene
HEMA: Acrylic monomer, hydroxyethyl methacrylate
IGRACURE 184: Photoinitiator
GRECO 302Si-1: Solvent Subsequently, the following bonding test was performed with the use of the prepared compositions.

Example 7

After buffing the surfaces of several rubber substrates (vulcanized rubbers, commercially available from Zhen Tai Enterprise Co., Ltd) and applying a layer of the primer (GRECO 001AB) used for the rubber thereon, the coated rubber substrates were dried at a temperature of 60° C. for 3 minutes. A layer of the water based PU adhesive containing 4 wt % of the hardener (GRECO 6608 with 4 wt % of 367S) was then applied. The resulting rubber substrates were dried at a temperature of 60° C. for 5 minutes.

The composition of Preparation example 1 was applied to each of the cured silicone elastomer surfaces of HTV (hardness: 30, 40, 50, and 70) and RTV (hardness: 40, 50, and 60) and the cured silicone elastomer surface with high tear strength (as shown in Table 2), and then, the coated surfaces were dried at a temperature of 60° C. for 3 minutes. Subsequently, a layer of the water based PU adhesive containing 4 wt % of the hardener (GRECO 6608 with 4 wt % of 367S) was applied to each of the surfaces, and the resulting silicon elastomers were dried at a temperature of 60° C. for 5 minutes.

The rubber substrates were attached and pressed with the cured silicon elastomers via the coated surfaces, and then, the resulting laminates were placed for 24 hours. The test for the bonding strength was conducted in accordance with ASTM D1876 method and the results were shown in Table 2.

The above procedure was repeated, but the compositions of Preparation examples 2 to 6 were respectively applied to the cured silicone elastomer surfaces. The results for the bonding test were also shown in Table 2.

TABLE 2

The bonding strength without the UV light irradiation

| Hardness and species of silicone elastomer | | Preparation example 1 | Preparation example 2 | Preparation example 3 | Preparation example 4 | Preparation example 5 | Preparation example 6 |
|---|---|---|---|---|---|---|---|
| HTV | 30[1] | 1.6 | 0.6 | 0.8 | 0.2 | 0.6 | 0.6 |
|  | 40[2] | 1.8 | 0.9 | 1 | 0.6 | 0.2 | 0.5 |
|  | 50[3] | 0.5 | 0.4 | 0.7 | 0.6 | 0.2 | 0.4 |
|  | 70[4] | 0.3 | 0.5 | 0.6 | 0.4 | 0.8 | 0.6 |
| RTV | 40[5] | 0.3 | 0.2 | 0.2 | 0.8 | 0.2 | 0.3 |
|  | 50[6] | 0.6 | 0.4 | 1.2 | 0.5 | 0.4 | 0.4 |
|  | 60[7] | 0.3 | 0.2 | 0.2 | 0.2 | 0.2 | 0.2 |
| Silicone elastomer with high tear strength[8] | | 1 | 0.7 | 2.4 | 0.9 | 0.7 | 0.8 |

The unit of the values: kg/cm
[1],[2],[3],[4]independently represent the products 931TU, 941U, 951U, and 971Ty of Li Tai Industry Co., Ltd.
[5],[6],[7]independently represent the products 40, 50N, and 1990-60 of Li Tai Industry Co., Ltd.
[8]is produced by Sun Print 3-D Label Enterprise Co., Ltd.

Example 8

The procedure described in Example 7 was repeated, but the silicone elastomer surfaces were irradiated with the UV light for 7 minutes (the irradiating height of the UV light: 8 cm) by using AS-3000 apparatus prior to applying the water based PU adhesive. The test results of the bonding strength were shown in Table 3.

TABLE 3

The bonding strength with the UV light irradiation

| Hardness and species of silicone elastomer | | Preparation example 1 | Preparation example 2 | Preparation example 3 | Preparation example 4 | Preparation example 5 | Preparation example 6 |
|---|---|---|---|---|---|---|---|
| HTV | 30[1] | 2.3* | 2.7 | 0.8 | 4.7* | 0.5* | 2.8* |
|  | 40[2] | 2.8* | 2.0 | 0.6 | 2.5* | 1.6* | 1.1 |
|  | 50[3] | 1.5 | 1.4* | 0.6 | 2.9* | 1.1* | 2.2* |
|  | 70[4] | 1.0* | 1.4* | 2.5 | 1.6* | 1.5* | 1.0* |
| RTV | 40[5] | 2.4* | 1.1* | 0.4 | 2.5* | 1.4* | 0.9 |
|  | 50[6] | 4.5 | 3.5 | 0.7 | 3.4* | 2.5* | 0.9 |
|  | 60[7] | 1.8* | 1.1* | 0.4 | 5.0* | 2.1* | 1.5* |
| Silicone elastomer with high tear strength[8] | | 4.2* | 2.1 | 1 | 5.2* | 4.5* | 1.5 |

The unit of the values: kg/cm
*represents that the cured silicone elastomer was broken (material failure)
[1],[2],[3],[4]independently represent the products 931TU, 941U, 951U, and 971Ty of Li Tai Industry Co., Ltd.
[5],[6],[7]independently represent the products 40, 50N, and 1990-60 of Li Tai Industry Co., Ltd.
[8]is produced by Sun Print 3-D Label Enterprise Co., Ltd.

As shown in Table 2 and Table 3, the primer composition of the subject invention can improve the adhesion between the cured silicone elastomer surface and the adhesive, and therefore, the cured silicone elastomer surface can be effectively attached to the rubber surface. In particular, the test results of the bonding strength with the UV light irradiation further show that the material failure phenomenon occurred in the cured silicone elastomer, and thus demonstrate a good bonding strength between the two substrates.

Comparative Example 9

The rubber substrates that will be attached were prepared according to the procedure described in Example 7. Subsequently, after applying HM2500 hot glue produced by Dow Corning Company to the cured silicone elastomer surfaces of HTV (hardness: 30) and RTV (hardness: 40) respectively, the cured silicone elastomer surfaces were attached with the prepared rubber substrates. After 24 hours, the test for the bonding strength was conducted in accordance with ASTM D1876 method. The test results were shown in Table 4.

TABLE 4

The bonding strength of the commercial products

| Hardness and species of silicone elastomer | | HM2500 |
|---|---|---|
| HTV | 30[1] | 0.5 |
| RTV | 40[5] | Attaching Failure |

[1]represents the product 931TU of Li Tai Industry Co., Ltd.
[5]represents the product 40 of Li Tai Industry Co., Ltd.

As shown in Table 4, when using the commercial product (HM2500) to treat the cured silicone elastomer surface before applying an adhesive, the effect for improving the adhesion of the adhesive to the surface is limited.

Preparation Examples 10 to 17

Each composition was prepared using the species of the components and the amounts listed in Table 5:

TABLE 5

| Component (wt %) | Preparation example No. | | | | | | | |
|---|---|---|---|---|---|---|---|---|
|  | 10 | 11 | 12 | 13 | 14 | 15 | 16 | 17 |
| S1 | 20 |  |  |  | 10 | 5 | 2.5 | 20 |
| S2 |  | 20 |  |  |  |  |  |  |
| S3 |  |  | 20 |  |  |  |  |  |
| S4 |  |  |  | 20 |  |  |  |  |
| EAC | 79.99 | 79.99 | 79.99 | 79.99 | 89.99 | 94.99 | 97.49 | 70 |
| HEMA | 0.01 | 0.01 | 0.01 | 0.01 | 0.01 | 0.01 | 0.01 | 10 |

S1: Silane monomer, N-(n-butyl)-3-aminopropyltrimethoxysilane
S2: Silane monomer, 3-aminopropyltriethoxysilane
S3: Silane monomer, N-(2-aminoethyl)-3-aminopropyltrimethoxysilane
S4: Silane monomer, Bis(3-trimethoxysilylpropyl)amine
EAC: Solvent, ethyl acetate
HEMA: Acrylic monomer, hydroxyethyl methacrylate Subsequently, the following bonding test was performed with the use of the prepared compositions.

Example 18

After buffing the surfaces of several rubber substrates (vulcanized rubbers, commercially available from Zhen Tai Enterprise Co., Ltd) and applying a layer of the primer (GRECO 001AB) used for the rubber thereon, the coated rubber substrates were dried at a temperature of 60° C. for 3 minutes. A layer of the water based PU adhesive containing 4 wt % of the hardener (GRECO 6608 with 4 wt % of 368) was then applied. The resulting rubber substrates were dried at a temperature of 60° C. for 5 minutes.

The composition of Preparation example 10 was applied to the cured silicone elastomer (as listed in Table 6) surface, and then, the coated surface was dried at a temperature of 60° C. for 3 minutes and subjected to an plasma treatment using oxygen plasma under a flow rate of 500 ml/min at a power of 2400 W for 3 minutes (plasma treatment apparatus SCUD-L, commercially available from C Sun MFG Ltd.). Subsequently, a layer of the water based PU adhesive containing 4 wt % of the hardener (GRECO 6608 with 4 wt % of 368) was applied to the surface, and the resulting silicon elastomer was dried at a temperature of 60° C. for 5 minutes.

The rubber substrate was attached and pressed with the cured silicon elastomer via the coated surface. The test for the bonding strength was conducted in accordance with ASTM D1876 method. The initial tension was the bonding strength measured after the resulting laminate was placed for 10 minutes, and the later tension was the bonding strength measured after the resulting laminate was placed for 24 hours. The results were shown in Table 6.

The above procedure was repeated, but the compositions of Preparation examples 11 to 13 were respectively applied to the cured silicone elastomer surfaces. The results for the bonding test were also shown in Table 6.

TABLE 6

The bonding strength with plasma treatment

| Hardness and species of silicone elastomer | | Preparation example 10 | Preparation example 11 | Preparation example 12 | Preparation example 13 |
|---|---|---|---|---|---|
| Leefong 50[1] | Initial tension | 3.8* | 3.7* | 0.5 | 0.6 |
| | Later tension | 7.3* | 6.4* | 3.8 | 5.3* |

The unit of the values: kg/cm
*represents that the cured silicone elastomer was broken (material failure)
[1]represents the product 50A of Lee Fong international (Group) Co., Ltd.

The results of Table 6 show that the composition of the subject invention can be used in combination with the plasma treatment for the cured silicon elastomer.

Example 19

The procedure described in Example 18 was repeated, but the plasma treatment was carried out for 10 minutes and the compositions of Preparation examples 10 and 17 were applied to the cured silicone elastomer surfaces with different hardness (as listed in Table 7). The test results of the bonding strength were shown in Table 7.

TABLE 7

The bonding strength with plasma treatment

| Hardness and species of silicone elastomer | Preparation example 10 | | Preparation example 17 | | Without primer composition | |
|---|---|---|---|---|---|---|
| | Initial tension | Later tension | Initial tension | Later tension | Initial tension | Later tension |
| Leefong 30[1] | 2.7* | 4.9* | 1.8 | 4.2 | 0 | 0 |
| 40[2] | 2.4 | 6.4* | 1.6 | 5.2* | 0 | 0 |
| 50[3] | 2.2 | 6.6* | 1.1 | 5.5* | 0 | 0 |

The unit of the values: kg/cm
*represents that the cured silicone elastomer was broken (material failure)
[1],[2],[3]independently represent the products 30A, 40A, 50A of Lee Fong international (Group) Co., Ltd.

As shown in Table 7, the combination use of the plasma treatment and the primer composition of the subject invention improves the adhesion of the cured silicone elastomer and other substrate.

Example 20

The procedure described in Example 18 was repeated, but the compositions of Preparation examples 10, 14, 15, and 16 were applied to the cured silicone elastomer surfaces. The test results of the bonding strength were shown in Table 8.

TABLE 8

The bonding strength with plasma treatment

| Hardness and species of silicone elastomer | | Preparation example 10 | Preparation example 14 | Preparation example 15 | Preparation example 16 |
|---|---|---|---|---|---|
| Leefong 40[1] | Initial tension | 4.0* | 3.5 | 1.2 | 0.6 |
| | Later tension | 4.7* | 5.0* | 4.5* | 2.9 |

The unit of the values: kg/cm
*represents that the cured silicone elastomer was broken (material failure)
[1]represents the product 40A of Lee Fong international (Group) Co., Ltd.

As shown in Table 8, when the primer composition of the subject invention was used in combination with the plasma treatment, the bonding strength is higher when the content of silane monomer in the primer composition is higher than 10 wt %.

Example 21

The procedure described in Example 18 was repeated, but only the composition of Preparation example 10 was used and the plasma treatment was performed for 3 minutes, 6 minutes, or 10 minutes using oxygen plasma or air plasma. The test results of the bonding strength were shown in Table 9.

TABLE 9

The effect of the time and gas species of plasma treatment

| Hardness and species of silicone elastomer | Plasma treatment | | Preparation example 10 | |
|---|---|---|---|---|
| | Gas species | Time | Initial tension | Later tension |
| Leefong 40[1] | Oxygen | 3 minutes | 4.4* | 5.7* |
| | | 6 minutes | 2.4 | 5.6* |
| | | 10 minutes | 2.0 | 5.1* |
| | Air | 3 minutes | 5.3* | 7.2* |
| | | 6 minutes | 2.9 | 5.2* |
| | | 10 minutes | 2.2 | 6.0* |

The unit of the values: kg/cm
*represents that the cured silicone elastomer was broken (material failure)
[1]represents the product 40A of Lee Fong international (Group) Co., Ltd.

Example 22

The procedure described in Example 18 was repeated, but only the composition of Preparation example 10 was used and the flow rate of oxygen plasma was adjusted to 500 ml/min, 1000 ml/min, or 1500 ml/min. The test results of the bonding strength were shown in Table 10.

TABLE 10

The effect of the flow rate of plasma gas

| Hardness and species of silicone elastomer | Oxygen plasma Flow rate (ml/min) | Preparation example 10 | | |
|---|---|---|---|---|
| | | 500 | 1000 | 1500 |
| Leefong 30[1] | Later tension | 3.5* | 3.6* | 3.3* |

The unit of the values: kg/cm
*represents that the cured silicone elastomer was broken (material failure)
[1]represents the product 30A of Lee Fong international (Group) Co., Ltd.

As shown in Tables 9 and 10, during the plasma treatment, the bonding effect of the cured silicone elastomer can be adjusted by changing the gas species and its flow rate, as well as the treatment time. In general, the bonding effect attained by oxygen plasma is better than that attained by air plasma.

Example 23

The rubber substrates that will be attached were prepared according to the procedure described in Example 18, and then, the composition of Preparation example 10 was applied to the cured silicone elastomer surfaces. After the resulting rubber substrates were dried at a temperature of 60° C. for 3 minutes, the rubber substrates were irradiated with the UV light for 7 minutes (the irradiating height of the UV light: 6 cm) by using AS-3000 apparatus, or subjected to a plasma treatment with oxygen plasma or nitrogen plasma under a flow rate of 500 ml/min at a power of 2400 W for 3 minutes (plasma treatment apparatus SCUD-L, commercially available from C Sun Mfg. Co., Ltd). Subsequently, a layer of the water based PU adhesive containing 4 wt % of the hardener (GRECO 6608 with 4 wt % of 368) was applied to the surfaces, and the resulting silicon elastomers were dried at a temperature of 60° C. for 5 minutes.

The rubber substrate was attached and pressed with the cured silicon elastomer via the coated surface. The test for the bonding strength was conducted in accordance with ASTM D1876 method. The initial tension was the bonding strength measured after the resulting laminate was placed for 10 minutes, and the later tension was the bonding strength measured after the resulting laminate was placed for 24 hours. The results were shown in Table 11.

TABLE 11

The effect of UV light radiation and plasma treatment

| Hardness and species of silicone elastomer | | | UV light irradiation | Oxygen plasma | Nitrogen plasma |
|---|---|---|---|---|---|
| Leefong | 40[1)] | Initial tension | 0.3 | 5.2* | 2.8 |
| | | Later tension | 3.9* | 5.7* | 4.5* |

The unit of the values: kg/cm
*represents that the cured silicone elastomer was broken (material failure)
[1)]represents the product 40A of Lee Fong international (Group) Co., Ltd.

As shown in Table 11, the bonding strength of the cured silicone elastomer, especially the initial tension, is further improved by the composition of the subject invention in combination with the plasma treatment.

Example 24

The procedure described in Example 23 was repeated, but the cured silicone elastomer surfaces were firstly irradiated with the UV light for 7 minutes (the irradiating height of the UV light: 6 cm) by using AS-3000 apparatus, or subjected to the plasma treatment with oxygen plasma or nitrogen plasma at a power of 2400 W for 3 minutes (plasma treatment apparatus SCUD-L, commercially available from CSun Mfg. Co., Ltd), and then, the composition of Preparation example 10 was applied to the cured silicone elastomer surfaces and dried at a temperature of 60° C. for 3 minutes. Subsequently, a layer of the water based PU adhesive containing 4 wt % of the hardener (GRECO 6608 with 4 wt % of 368) was applied to the surfaces, and the resulting silicon elastomers were dried at a temperature of 60° C. for 5 minutes.

The rubber substrate was attached and pressed with the cured silicon elastomer via the coated surface. The test for the bonding strength was conducted in accordance with ASTM D1876 method. The initial tension was the bonding strength measured after the resulting laminate was placed for 10 minutes, and the later tension was the bonding strength measured after the resulting laminate was placed for 24 hours. The results were shown in Table 12.

TABLE 12

The effect of applying the primer composition after UV/plasma treatment

| Hardness and species of silicone elastomer | | | Preparation example 10 | | |
|---|---|---|---|---|---|
| | | | UV light irradiation | Oxygen plasma | Nitrogen plasma |
| Leefong | 40[1)] | Initial tension | 0.9 | 2.6 | 2.4 |
| | | Later tension | 3.6* | 3.1* | 3.4* |

The unit of the values: kg/cm
*represents that the cured silicone elastomer was broken (material failure)
[1)]represents the product 40A of Lee Fong international (Group) Co., Ltd.

As shown in Table 12, when the cured silicone elastomer was treated by UV light or plasma before the primer composition of the subject invention is applied thereto, the improvement of the adhesion of an adhesive to the cured silicone elastomer surface still can be achieved, and thereby attaching the cured silicone elastomer with other substrates through the adhesives. The results of Tables 11 and 12 indicate that for a UV light irradiation, a better bonding capability (especially for the initial tension) can be achieved when the cured silicone elastomer is subjected to a UV light irradiation before the composition is applied thereto. On the contrary, for a plasma treatment, a better bonding capability can be achieved when the cured silicone elastomer is subjected to a plasma treatment after the composition is applied thereto.

The above examples are exemplified to illustrate the principle and effects of the subject invention, but not to limit the subject invention. People skilled in this field may proceed with a variety of modifications and replacements to the above examples without departing from the technical principle and spirit of the subject invention. Therefore, the scope of the protection of the subject invention should be covered in the following claims as appended.

What is claimed is:

1. A method for improving an adhesion of an adhesive to a cured silicon-containing surface, comprising applying a primer composition to the surface before applying the adhesive; and subjecting the surface to a plasma treatment before or after the composition is applied thereto;
wherein the primer composition comprises:
a polar organic solvent;
an acrylic monomer selected from a group consisting of hydroxymethyl acrylate, hydroxymethyl methacrylate, hydroxyethyl acrylate, hydroxyethyl methacrylate, hydroxypropyl acrylate, hydroxypropyl methacrylate, and combinations thereof; and
an amino-containing silane having a formula of $(R^1O)_x(R^2)_y SiR^3NHR^4$, wherein each $R^1$ independently represents H, $C_1$-$C_{12}$ hydrocarbonyl, or aryl, each $R^2$ independently represents H, O, $C_1$-$C_{12}$ hydrocarbonyl, or aryl, $R^3$ represents divalent $C_1$-$C_6$ hydrocarbonyl being substituted or unsubstituted with one or more aryl rings and the carbon atom chain of the hydrocarbonyl can be inserted with one or more aryl rings, $R^4$ represents H, $C_1$-$C_{12}$ hydrocarbonyl, amino-$C_1$-$C_{12}$ hydrocarbonyl, or phenylamino, and x is 1, 2 or 3, y is 0, 1 or 2, and the sum of x and y is 3;
wherein the amount of the acrylic monomer ranges from about 0.01 wt % to about 25 wt % and the amount of the amino-containing silane ranges from about 1 wt % to about 35 wt %, based on the total weight of the composition.

2. The method of claim 1, wherein the plasma treatment is carried out at a power of about 500 W to about 2500 W for about 1 minute to about 20 minutes.

3. The method of claim 2, wherein the plasma treatment is carried out at a power of about 2000 W to about 2500 W for about 3 minutes to about 10 minutes.

4. The method of claim 1, wherein the plasma treatment is carried out using a plasma selected from a group consisting of air plasma, nitrogen plasma, oxygen plasma, and combinations thereof.

5. The method of claim 4, wherein the plasma is oxygen plasma.

6. The method of claim 1, wherein the material of the silicon-containing surface is selected from a group consisting of glass, glass fiber, silicone elastomer, and combinations thereof.

7. The method of claim 6, wherein the material of the silicon-containing surface is silicone elastomer.

8. The method of claim 1, wherein the silicon-containing surface is a costume surface, a shoe surface, a surface of a costume label, a surface of a costume decoration, a surface of a shoe label or a surface of a shoe decoration.

9. The method of claim 1, further comprising a step of drying the coated surface after applying the composition to the surface.

\* \* \* \* \*